United States Patent [19]

Li

[11] 4,368,509
[45] Jan. 11, 1983

[54] SELF-OPTIMIZING MACHINE AND METHOD

[76] Inventor: Chou H. Li, 379 Elm Dr., Roslyn, N.Y. 11576

[21] Appl. No.: 275,758

[22] Filed: Jun. 22, 1981

Related U.S. Application Data

[63] Continuation-in-part of Ser. No. 69,297, Aug. 24, 1979, abandoned.

[51] Int. Cl.³ .................. G05B 13/02; G05B 13/04
[52] U.S. Cl. ............................... 364/148; 364/149; 364/152; 364/178; 364/442; 364/497
[58] Field of Search ............... 364/105, 106, 111, 112, 364/431, 500, 501, 502, 148–166, 178, 179, 442, 497, 479

[56] References Cited

U.S. PATENT DOCUMENTS

| | | | |
|---|---|---|---|
| 3,460,096 | 8/1969 | Barron | 364/105 X |
| 3,466,430 | 9/1969 | Hardaway | 364/105 |
| 3,519,998 | 7/1970 | Barron | 364/105 X |
| 3,576,976 | 5/1971 | Russo | 364/105 |
| 3,694,636 | 9/1972 | Smith, Jr. | 364/105 |

OTHER PUBLICATIONS

Li, "Worksheet Gives Optimum Conditions", Chemical Engineering, Apr. 2, 1958.
Munson et al., "Optimization by Random Search on the Analog Computer", National Simulation Conf; Dallas, Texas, Oct. 25, 1968.
Ramsay, "A Family of Gradient Methods of Optimization", The Computer Journal, vol. 13, No. 4, Nov. 1970, pp. 413–417.
Li, "A Sequential Method for Screening Experimental Variables", American Statistical Association Journal, Jun. 1962, pp. 455–477.
Heiserman, "How to Build Your Own Self-Programming Robot", Tab Books, Blue Ridge Summit, PA, 1979, pp. 202–205.

Primary Examiner—Joseph F. Ruggiero

[57] ABSTRACT

The invention discloses method for self-optiming, in real time, a machine relative to a specific performance characteristic in response to variations on a prescribed number m of variables. This method comprises selecting a statistical design; repeatedly and at n time instants adjusting conditions of the m variables and simultaneously recording the dependent values of the performance characteristic; analyzing the n sets of data to determine the functional relationship between the m variables and the specific performance characteristic; determining the combination of the m variables that gives optimum value of the performance characteristic; and setting the conditions of the m variables at the thus-determined combination. A machine in the form of a programmed microprocessor embodying this self-optimizing method is also disclosed.

28 Claims, 4 Drawing Figures

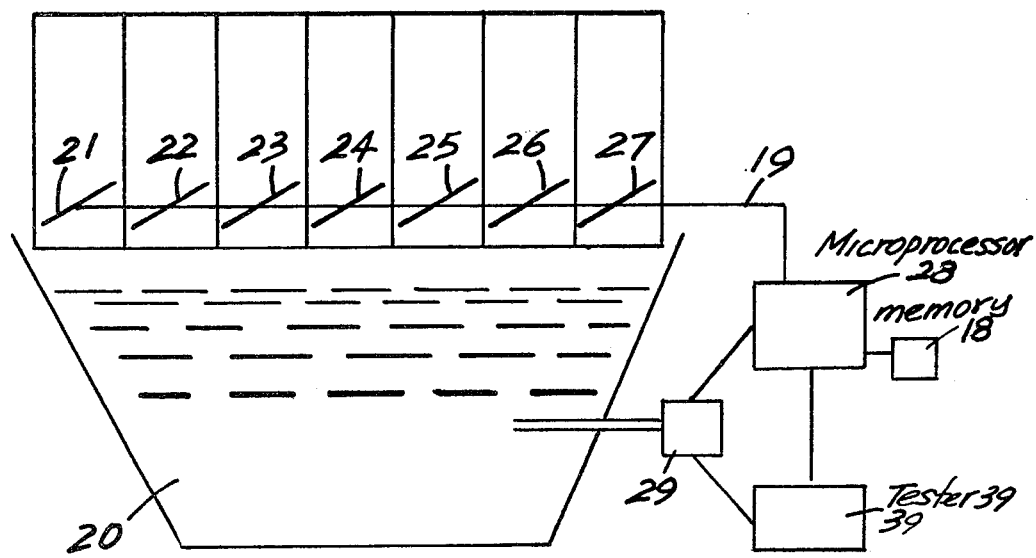
Fig. 2
Fig. 3
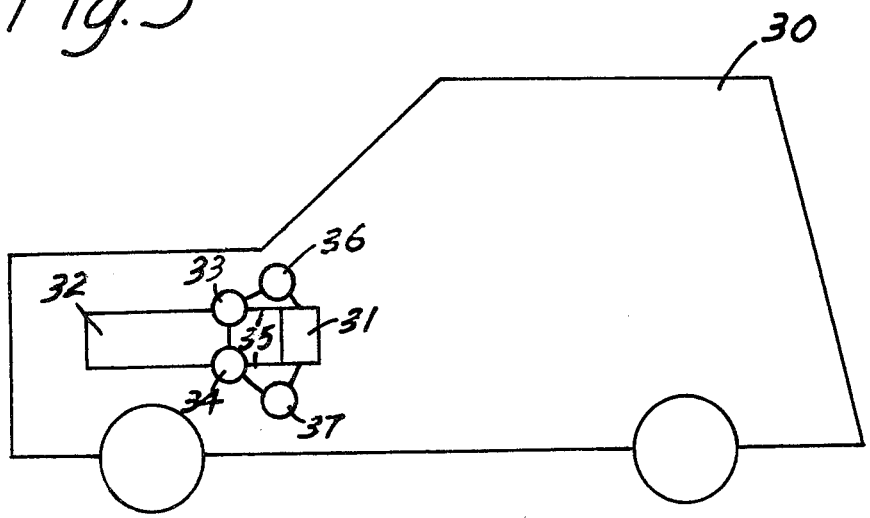

SELF-OPTIMIZING MACHINE AND METHOD

CROSS-REFERENCE

This is a continuation-in-part of my pending application Ser. No. 69,297, filed Aug. 24, 1979 and now abandoned. I hereby incorporate by reference this pending application.

BACKGROUND

1. Field:

This invention relates to self-optimizing machines, and more particularly relates to machines which self-optimize dynamically and in real time.

2. Prior Art:

Automatic machines are very common. Numerically controlled machining, drafting, and parts assembling have already made their great impacts. Automatically controlled electrical drills and other tools, automobile speed, room or house heating or cooling, home appliances, industrial processing equipment, and many other machines or equipment are becoming increasingly popular.

All these automatic machines use the rapidly developing microelectronics, particularly microprocessors. Unfortunately, these machines are not yet really controlled to optimize, dynamically and in real time, a desired performance characteristic such as fuel economy, product yield, purity, or cost, total cost or time of operation, and the like. The reasons are not difficult to see. In the case of automobile speed control, for example, to optimize a desired performance characteristic such as fuel economy or total cost of trip, a certain prediction or estimation equation is first developed and then programmed onto the microprocessor for execution. But the automobile speed depends not only on such variables as engine speed, temperature, and various settings on, e.g., the carburetor or distributor; automobile design and style; type and amount of gas and oil; load on the automobile; . . . , but also on many other usually neglected yet critical factors such as wind type, direction, or velocity; rain or snow; driver habit and condition; road age, slope, or condition; age and condition of automobile and engine; and the like, which change continuously.

The effects of these and many other variables and factors have never been completely determined, or even understood. These effects may also change from one month, week, day, or even instant to another. In addition, these factors or variables may interact strongly, i.e., have large synergistic or compensating effects. Many of these variables may not even be known or suspected.

Thus, there are definitely a large number of variables that may or may not be present, important, or critical. This large number may be 7, 31, 63, 127, 200, or even 1000 or 40,000. All must first be investigated to find out their functional relationship to the desired performance characteristic, so that this characteristic may be meaningfully optimized. Merely missing one or a few of the critical variables may make the optimization inefficient or even useless. Yet the very many variables and their surprisingly many interactions, and the vastly more tests to be performed normally would make the task of their understanding and optimizing hopelessly impossible to most people. The number n of tests to test m variables at only two levels or conditions each would require $n=2^m$ tests. For $m=7$, 31, 63, 127, and 200, $n=128$, $2.148 \times 10^9$, $9.223 \times 10^{18}$, $1.701 \times 10^{38}$, and $1.606 \times 10^{60}$, respectively.

Even for small m, e.g., 3 or 4, the usual practice is to take a few "samples" or "representative machines", on which to run limited number of tests within very narrow experimental ranges, with an experimental design and procedure which leaves much to be desired, i.e., without use of modern statistical techniques. Still, the investigator is often at a loss as to which samples to select. How many? How many tests on each sample? How to test? . . . The hope is that these tests would represent the entire population of machines (often a totally unjustified extrapolation). The microprocessor is then programmed according to these sampling results. No wonder these results can lead to erroreous conclusions. Often, the "optimized" conditions may not be optimal at all, but are far away from the optimum.

To compound the dilemma, the fact is that no two cars are identically the same. This is partly because of the unavoidable variable tolerances on the car components and the many interactions of these components. For example, two similar components may behave very differently if both are at the upper limits of their respective specifications, compared to when both are at the lower limits. The chance combination of which cars having what critical component combinations is totally unknow and unpredictable. The only way to truly and meaningfully optimize the performance characteristic of a particular automobile, then, is to determine the unique functional relationship of the many variables on the performance characteristic of this very, particular automobile itself, and then to set the levels or conditions of these many variables at the unique combination of their respective optimal values, at the very instant the functional relationship is determined and before this relationship changes.

In addition, because the car is in a dynamic environment, these tests, determinations, and variable settings must also be done dynamically, i.e., very rapidly, to be periodically checked and/or adjusted every hour, minute, or even fractional second as is needed. Such requirements can also only be achieved with systematic statistical designs and with the most modern microelectronics.

In the U.S. patent prior art, Hardaway's extreme parameter search control system (U.S. Pat. No. 3,466,430) adjusts one parameter or variable at a time. Russo (U.S. Pat. No. 3,576,976) provides a control system having a pattern recognition network in combination with a linear regression network. Smith's (U.S. Pat. No. 3,694,636) programmed digital computer process control also employs least squares regression fitting of collected data. Barron (U.S. Pat. No. 3,460,096 and 3,519,998) filed in 1966–1967 for his control system. But in these years, the microprocessor technology was not developed. Thus, none of these patented inventions deal with the unique problems addressed in this application, i.e., self-optimizing machines operative in real time with nanosecond speeds together with modern statistical designs (the prior art are totally silent on this) for the optimizing of large number of variables (7, 63, 511, 40,000, . . . ) within minutes or fractional seconds. There simply was no microprocessor in 1966–67 to fit into a car or patient's body, or a drill that was power-thrifty and can make billions of decisions within minutes or seconds, even if the efficient statistical designs to be described were used. But these patents do provide the background for use of control systems, actuators, calculators, timing circuits, D/A converters, storage memory, sensors, comparator, logic devices, sign detector, ..., which are often useful in the practice of this invention.

Accordingly, an object of the present invention is to provide improved self-optimizing machines;

A further object of the invention is to provide self-optimizing machines equipped with modern microprocessors with nanosecond computing speeds and programmed to generate modern design matrices capable of handling tens, hundreds, thousands, or more variables in real time;

Another object of this invention is to provide self-optimizing machines which can be optimized dynamically and almost continuously and instantly;

A broad object of the invention is to provide self-optimizing machines based on controlled tests performed only on the very particular machines themselves without relying on extrapolations based on sampling test results obtained on other similar but often different or even irrelevant machines;

Another object of the invention is to optimize machines in real time by the installation thereon batteries of modern microelectronics, sensors, actuators, and related devices;

A further object of the invention is to provide small (less than 0.1 m$^3$), rapid (nanosecond), efficient self-optimizing machines to fit into small or subcompact but fast moving cars or handdrills and rapidly reacting furnaces or dying patients for instantly correcting deviations from ideal conditions or dispensing necessary chemicals or drugs in optimum combinations in a continuous manner;

SUMMARY

To these ends, the present invention provides a method for self-optimizing a machine by selecting an efficient, statistical design; adjusting the conditions of the m variables according to the design matrix; performing the necessary tests; collecting and recording many sets of data on the conditions and value of the performance characteristic to be optimized; analyzing the data on the machine itself to determine the functional relationship between the variables and the performance characteristic; computing the unique combination for a particular time instant, machine condition, environment, or service requirement, of the many variables which optimize dynamically and in real time the critical performance characteristic. A machine operating on the basis of this method is also disclosed.

BRIEF DESCRIPTION

The invention and its further objects and features will be more clearly understood from the following detailed description taken in conjunction with the drawings in which:

FIG. 1 shows the flow chart of the method;
FIG. 2 shows a self-optimizing furnace for a special iron-base alloy;
FIG. 3 shows a self-optimizing car according to the invention; and FIG. 4 shows a flowchart of a self-optimizing method by means of a sequential screening method.

DETAILED DESCRIPTION

It will be understood that the specific embodiments described are merely illustrative of the general principles of the invention and that various modifications, combinations, improvements and the like are feasible without departing from the spirit and scope of the invention. That is, the method and equipment of the invention is of general applicability for self-optimizing many and various machines in real time, dynamically, and with lightening speed in the dealing of tens, hundreds, thousands, or more variables requiring billions or more calculation steps.

Figure 1:
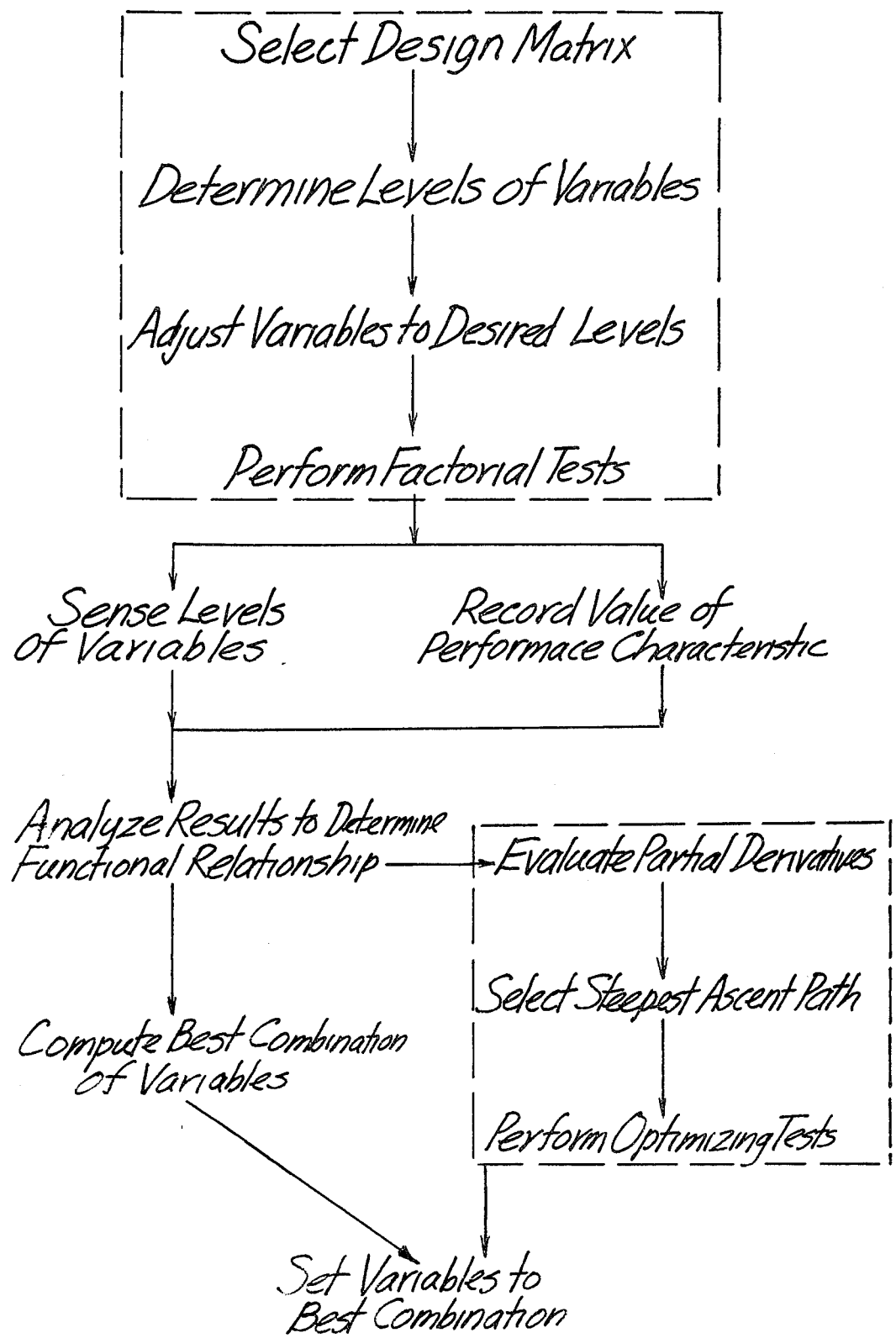

The various steps in a typical self-optimizing method is shown in the flow chart given as FIG. 1. The following example illustrates in detail the application of the principle of the method. The example relates to Example 1 given in my paper on "Worksheet Gives Optimum Conditions", published in Chemical Engineering, Apr. 7, 1958. The design matrix, Mtxdsn (J,I), however, has been modified for ease of programming. Tables 1 and 2 show the design matrix and program listing, respectively. The design matrix is an 8 (or $2^k$)×7 ($2^k-1$) matrix for dealing with up to m=7 variables in n=8 tests. It can be built from a 4×3 matrix (as shown by the heavy line) which in turn can be built from a 2×1 matrix. The k values in these three matrices are: 3, 2, and 1, respectively. To determine the first column in a new design matrix k'=k+1, one puts down the low-level condition (or level 1) in the first $2^k$ tests, followed by high-level condition (or level 2) in the last $2^k$ tests, as shown in the do loop (with statement number 27) of the program listing of Table 2. After copying the old matrix for the lower left quarter of the new matrix (as shown in Tables 1 and 2), the other $2^k-1$ columns, i.e., columns JJK=$2^{k-1}$+JJ, JJ=1 to NIM (=NI−1=$2^{k-1}-1$) are obtained, for a given test number J, by comparing the conditions or levels in column JJ and NI. If these two columns have the same conditions 1 or 2, this new JJK column have condition 1, otherwise 2, that is; if the sum of these two levels (1 or 2) is odd or even, respectively. While this design matrix (Table 1) can be used to test m=1, 3, 7=$2^k-1$ variables in n=$2^k-1$=2, 4, 8 tests, the last 8×7 matrix can be easily be expanded according to the above principle or the program (Table 2) to handle m=15, 31, 63, 127, 255, 511, 1011, ... =$2^k-1$ variables in n=m+1=16, 32, 64, 128, 256, 512, 1012, ... tests, respectively.

The example given deals with a machine 20 (i.e., a furnace to make the special iron-base alloy) which is to self-optimize relative to a specific performance characteristic, i.e., hot tensile strength in 1,000 psi, of the resultant alloy produced on the machine in response to variations in a fixed number (i.e., m=7) of variables (i.e., A through G for, respectively, the seven chemical elements Cr, Ni, Mo, V, Nb, Mn, and C). This machine has a built-in microprocessor 28 which, given the base level (e.g., 4% for Cr) and unit of change (e.g., 1% for Cr) for the variables, automatically computes the desired levels, i.e., for a two-level factorial experiment, the high level, hilo(1,2)=5(%), and low level, hilo(1,1)=3(%) for the first variable Cr. For the other variables, m=2-7, the base levels are: base(i)=2, 0.1, 0.02, 0.1, 0.4, and 0.4 (%), respectively; while the unit of change: unit(i)=1, 0.1, 0.02, 0.1, 0.1, and 0.1, (%) respectively. The complete m×2 hilo matrix can thus be completed.

The design matrix selected by the microprocessor according to the previously listed program will have an n=$2^k=2^3$=8. At two levels each, this normally requires $2^7$=128 tests. The designed experiment is thus a $\frac{1}{2}^{7-3}=\frac{1}{2}^4$=1/16 fractional replicate experiment. That is, only one out of every 16 tests is to be actually run. The savings are very substantial. With larger n and m, the savings are even greater.

Seven (=m) actuators or alloy element feeders 21–27 are provided one for each element on the machine. These actuators are sequentially actuated 8 (=n) times, being controlled by the same microprocessor 28 through the interconnecting line 19 in FIG. 2. These actuators adjust simultaneously the 7 variables (i.e., elements Cr, Ni, . . . ) according to the design matrix mtxdsn(8,7) and high-low level matrix hilo(7,2). For example, for the first test (i=1), all elemental additions are at the low levels, i.e., hilo(i,1), i=1,7, or 3% Cr, 1% Ni, . . . . The self-optimizing machine or furnace then makes 8 melts or tests according to the densing matrix (Table 1) to complete the factorial experiment. One or more test samples as sampled by sampler 29 are automatically prepared from each of the 8 melts for the determination of hot tensile strength results on a hot tensile strength testing device 39. The 8 test results are recorded and stored in the memory section (not shown) of the microprocessor, and statistically analyzed by the microprocessor to determine the function relationship between the seven elements or variable on the hot tensile strength, performance characteristic pfmcha(j), j=1,8, according to the previous program listing. From this relationship, the optimizing tests are designed and tested along the steepest ascent path as determined by the base levels, base (i), and effects (i) and unit of change, unit (i). Various ways of considering that optimization has been achieved are given in the last group of comment statements between statement Nos. 33 and 46. The 7 actuators are then adjusted under the control of the microprocessor 28 to be set at their respective, thus-determined levels along the steepest-ascent path. This procedure completes the self-optimizing process on this machine or furnace.

The statistical data analysis on the performance characteristic data, pfmcha(j), yields the main effects of the m variables, effect (i), and also their interactions, couple (i,1). These main effects, when multiplied by the respective units of change, unit(i), give the partial derivatives, change (i), if the constant constn is 1.0. These partial derivatives, relative to the m variables or elemental concentrations, do not include the interactions, couple (i).

In some cases, complete fractional factorial experiments need or cannot be done. Proper sensors are then provided at strategic locations to sense simultaneously the levels of all the variables at various time instants and also to record the performance characteristic (i.e., hot tensile strength in the above example). A mass spectrograph, for example, may be installed on the machine to analyze samples at selected time intervals as to the concentration of the seven selected elements. A regression equation can then be determined which expresses the functional relationship between the seven elements and the hot tensile strength. For programming the microprocessor 28 in the determination of the regression equation, see, e.g., Russo U.S. Pat. No. 3,576,976.

The actuators on the above-described machine 20, i.e., furnace, are alloy element feeders in the form of, e.g., simple supply gates 21–27 controlled as to feeding time and rates by the microprocessor 28. These supply gates are connected to the storage bins for the seven elements, one for each bin. Either a single sensing or measuring device in the form of a mass spectrograph, Auger analyzer, microprober, . . . ; or several separate sensors; may be used to analyze or determine the levels of the seven elemental concentrations. As described above, the machine is also provided with a sampler 29, controlled also by the microprocessor 28, to take samples of the resultant alloy, periodically or at specified time instants, so as to collect n sets of data on pfmcha(j) for the determination of the required functional relationship for the optimizing path calculation. Note that actuators 21–27, sampler 29, and testing device 39 are all connected to the microprocessor 28 to be controlled thereby.

Very minor and slight modification of the above self-optimizing machine yields a drug-prescribing machine self-optimized to dispensing the optimum combination of drugs such as Cr, Ni, Mo, V, Nb, Mn, C (or others) through feeders 21–27 into drug-feeding device, such as a hypodermic needle or mouth-feeder. A tester 29 may be used to test the medical conditions of the human or animal patient so fed. Such conditions include vital functions of the organs: chemistry of the blood, urine and other liquids; or other physiological data to be optimized.

Figure 4:
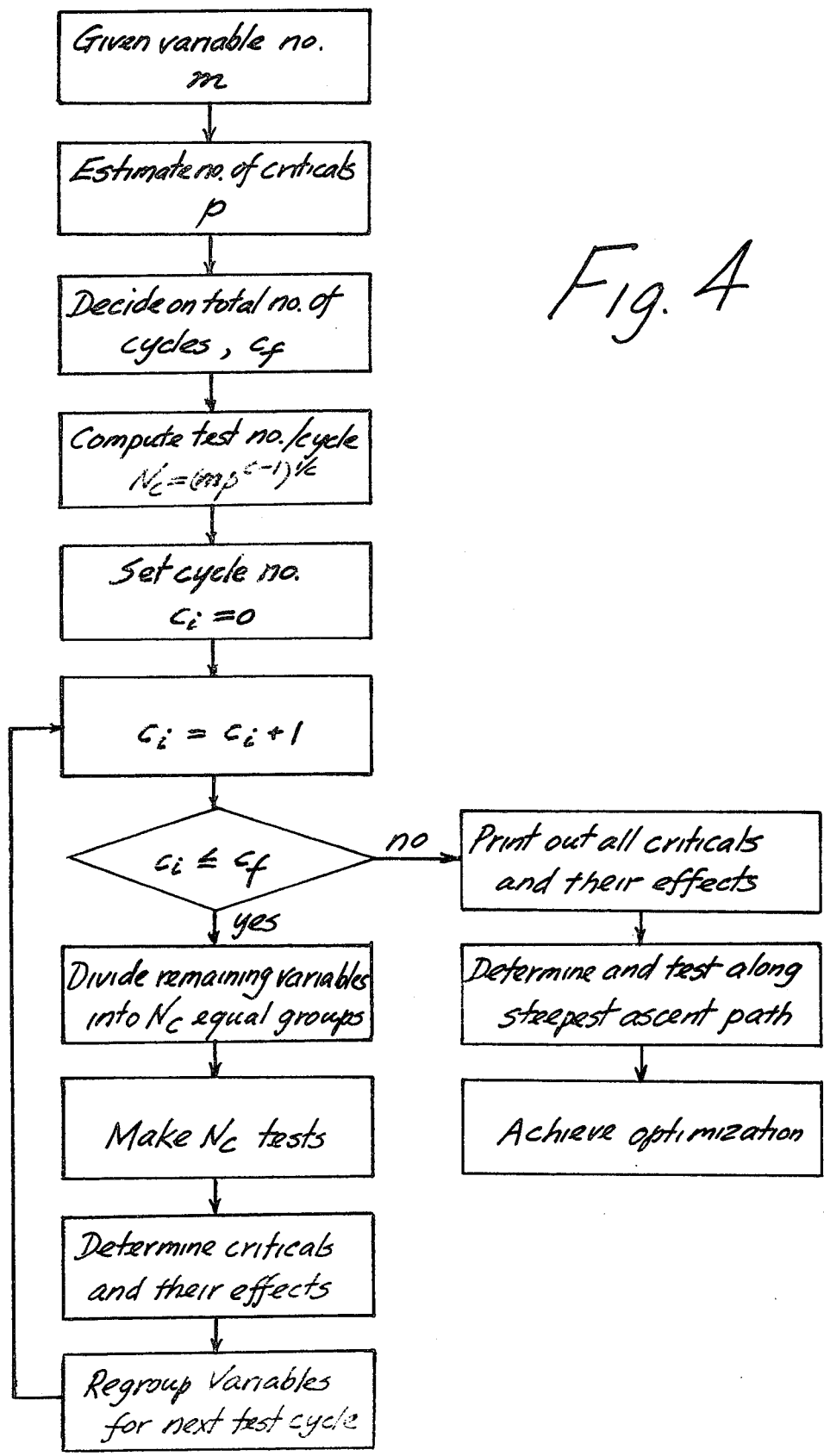

To screen or search thousands of drugs for a few that can cure a critical disease such as cancer, Li's sequential screening technique is used. This technique was published in Joun. Amer. Stat. Asso., Vol. 57, pp 455–477, 1962. It was shown that the best way to screen m drugs for a few (p) critical ones in c cycles should have the same number of tests in each cycle, $(mp^{c-1})^{1/c}$. For example, to screen 10,000 drugs or chemicals in c=4 cycles for an estimated p=10 critical drugs, each cycle requires 56.2 tests (i.e., one cycle may require 57 tests) all fed through separate bins through feeders. Ten of the 56.2 tests will show positive or negative effects. The other tests of the first cycle, i.e., 46.2 in number, will show no effect and all the drugs in these tests (46.2×10,000/56.2=8220.6) will not be tested any more. The 1779.4 drugs will be screened in the second cycle in 56.2 tests also each with 31.7 drugs and so on until all four cycles are completed. The total number of tests required is only 4×56.2=224.8 representing a saving of 97.752%. It was shown that even if the estimate of p is off, this number is still about the same. Further, if the negatively-effected drugs are also discarded together with the other insignificant drugs, the total number of tests is still smaller and saving greater. The flow-chart of this optimizing method is given in FIG. 4. Note that the 10,000×2 hilo matrix values can be, for each drug, no and yes (for levels 1 and 2, respectively), or low and high, or more specifically, 5 and 10% of the fatal dosage for the particular drug. One can thus also determine the effect(i), i=1,10000; change(i), i=1,10000; . . . so that the method of steepest ascent can be used also here.

For application of the self-optimizing method on a car or automobile, the specific performance characteristic may be fuel economy or minimum time of trip within certain constraints as to fuel consumption, engine wear, driver's fatigue, . . . . The variables easily include: car design and style, engine speed, temperature or settings, type and amount of fuel and oil, air-fuel ratio, pressures in combustion chambers, fuel ignition conditions, loading on car, exhaust design, age and condition of car, wind type, direction, and velocity, rain or snow, driver habit and contition, and road age, slope, and condition. Here, the sensors sense the pressures, temperatures, times, forces, fluid levels, flow rates, voltages, currents, . . . while the actuators actuate timers, metering devices, voltage regulators, force applicators, . . . . All these sensors and actuators are commercially available and may be suitably connected to the machine and its microprocessor and to each other if needed as well as to memory devices, as per conventional electronic control technology. For other applications to, e.g., building heating and/or cooling control, home appliance, industrial processing equipment, electrical tools, service equipment, . . . , the specific performance characteristics and selected variables are different and, hence, require different sensors and actuators (also commercially available), but the same microprocessor, interconnections, sensors, actuators, programs, . . . are still useful.

FIG. 3 shows a self-optimizing car 30 having a microprocessor 31, an engine or power unit 32, and sensors 33 and 34 which sense the voltage and flow rates (e.g., of fuel). The sensed signals are sent to the microprocessor by signal-transmitting lines 35. For simplicity of illustration, other sensors for, e.g., pressures, times, . . . , are not shown. The microprocessor 31 analyzes all the sensed and transmitted data in real-time and then directs the various actuators, i.e., the voltage regulator 36 and flow metering actuator 37 (other actuators not shown) to set these various parameters to their respective optimizing levels as dynamically determined by the microprocessor 31 from the real-time, fast delivered data.

The invention is not to be construed as limited to the particular forms disclosed herein, since these are to be regarded as illustrative rather than restrictive. For example, the optimizing procedure given only involve linear or main effects of the m variables, i.e., $$pfmcha = \sum_{i=0}^{m} a_i x_i (x_0 = 1)$$

even though interactions, couple(i), are also determined so that a $$\text{better model } pfmcha = \sum_{i=0}^{m} a_i x_i + \sum_{i=0, 1=0}^{m, m} b_{i1} x_i x_1$$

can readily be programmed to replace the one given. Still better models may involve non-linear effects such as $$\sum_{i=0}^{m} c_i x_i^2 + \sum_{i=0}^{m} d_i x_i^3 + \ldots$$

The partial derivatives $\partial pfmcha/\partial x_i$ can still easily be obtained and used for optimization as per, e.g., Hardaway's teaching. In oil or mineral drilling, pfmcha may be weighed drilling speed and cost/foot while variables drilling bit or machine design, rock formation, crew make-up, and water use.

TABLE 1

Design Matrix To Handle Up To 7 Variables.

|   | k = 1 | = 2 | | = 3 | | | |
|---|---|---|---|---|---|---|---|
| n = 1 | 1 | 1 | 1 | 1 | 1 | 1 | 1 |
| 2 | 2 | 1 | 2 | 1 | 2 | 1 | 2 |
| 3 | 1 | 2 | 2 | 1 | 1 | 2 | 2 |
| 4 | 2 | 2 | 1 | 1 | 2 | 2 | 1 |
| 5 | 1 | 1 | 1 | 2 | 2 | 2 | 2 |
| 6 | 2 | 1 | 2 | 2 | 1 | 2 | 1 |
| 7 | 1 | 2 | 2 | 2 | 2 | 1 | 1 |
| 8 | 2 | 2 | 1 | 2 | 1 | 1 | 2 |
| m = 1 | 2 | 3 | 4 | 5 | 6 | 7 | |

TABLE 2

Program Listing for the Self-Optimizing Method.

```
C   Program listing for self-optimizing method
    Dimension mtxdsn(512,511), pfmcha(512), effect (511),
    base(511), unit(511),
    change (511),set(511), couple(511,511),hilo(511,2)
C   Use larger dimensions for arrays and matrics
    if n > 512 and k > 9
    constn = 1. (or any other value to facilitate new settings, set(i))
    Find test number n and k, n = 2 k given m
    n = 1
    k = 0
20  k = k + 1
    n = n* 2
    if(n−1−m) 20,21,21
21  xn = n
C   Determine first column in design matrix mtxdsn(j,i)
    do 25 j = 1, n, 2
    jp = j + 1
    mtxdsn (j,i) = 1
25  mtxdsn (jp,1) = 2
C   Determine columns i = 2, k in design matrix
    do 26 i = 2, k
    ni = 2**(i−1)
    nim = ni − i
    nip = ni + 1
C   Determine lower left portion in new matrix, i.e.,
    mtxdsn (jj,ii), jj = nip,n
C   and ii = 2, nim
    do 24 jj = nip,n
    do 24 ii = 2,nim
    iim = ii − ni
24  mtxdsn(jj,ii) = mtxdsn(jj,iim)
C   Determine column $2^{k-1}$ in design matrix
    do 27 j = 1, ni
    jni = j + ni
    mtxdsn(j,ni) = 1
27  mtxdsn(jni,ni) = 2
C   Determine columns jj = ni to n−1 in design matrix
    do 28 j = 1, n
    do 28 jj = 1, nim
    jjk = jj + ni
    kk = mtxdsn(j,jj)+mtxdsn(j,ni)
28  Mtxdsn(j,jjk)=kk−kk/2*2+1
C   namely, if both mtxdsn(j,jj) and mtxdsn(j,ni) are 1 or 2,
    mtxdsn(j,jjk)=1;
C   Otherwise mtxdsn(j,jjk)=2.
26  continue
C   See if optimizing cycle number, ncycle, exceeds
    specific cycle number, ncycsp,
C   If so, optimizing has been completed, all variables and
    m actuators are then
C   set at the optimized values or conditions. If not, go to step 29.
    ncycle = 0
24  ncycle + ncycle + 1
    if (ncycle−ncycsp) 22, 22, 29
29  stop
C   Determine high and low levels for the m variables.
22  do 23 i = 1,m
    hilo(i,1) = base(i) − unit(i)
23  hilo(i,2) = base(i) + unit(i)
C   Use actuators as controlled by microprocessor to
    adjust the m variables to
```

TABLE 2-continued
Program Listing for the Self-Optimizing Method.

```
C     their respective high (level 2) or low (level 1) conditions
      according to design
C     matrix mtxdsn(j,i). Perform the n tests in n consecutive
      time instants.
C     collect and store data in microprocessor for the following
      analysis of data.
C     Statistical analysis of data to determine the functional
      relationship, i.e.,
C     effects and interactions of variables, effect(i) and
      couple(i,1), respectively.
C     Data used are the stored performance characteristic
      pfmcha(j), j=1,n.
      Do 31 i = 1, m
      effect(i) = 0.
      do 32 j = 1,n
      k = mtxdsn(j,i)
      xk = k
      xk = 2. *xk−3.
32    effect(i) = effect(i) + xk*pfmcha(j)
      effect(i) = effect(i)/xn
31    change(i) = change(i)* unit(i)* constn
C     Determine interaction between variables A and B, i.e.,
      couple(ia,ib).
      do 33 ia = 1,m
      couple(ia,ib)=0.
      do 34 ib = 1,m
      do 34 j = 1,n
      kab = mtxdsn(j,ia) + mtxdsn(j,ib)
      xkab = kab − kab/2*2 + 1      xkab = xkab*2. − 3.
34    couple(ia,ib) = couple(ia,ib) + xkab*pfmcha(j)
33    couple(ia,ib) = couple(ia,ib)/xn
C     Testing along steepest ascent path from base levels,
      base(i), with simultanous,
C     successive incremental changes, change(i), on
      all m variables to optimize
C     performance characteristic, pfmopt. If new pfmopt
      exceeds previous, stored
C     pfmopt,i.e., pfmstr, continue on steepest ascent path.
      If not, (1) pause;
C     (2) change base(i) to set(i), i.e., base(i) = set(i);
      (3) halve change(i); and
C     (4) go to step 24.
C     Alternately, if pfmcha becomes less than pfmstr,
      make change(i) = −change(i)/
C     2., i.e., halve change(i) and reverse sign to go back
      along the steepest ascent
C     path with closer steps. Stop when 3 (or 5 or other
      number) reversals and halv-
C     ing have taken place, with a program similar to
      Hardaway's three reversals
C     before switching parameters. This program listing
      not given here.
      j = 0
      pfmopt = 0.
      do 46 i = 1,m
46    set(i) = base(i)
44    j = j + 1
      if (j − 1000) 41,41,43
41    pfmstr = pfmopt
      do 42 i = 1,m
42    set(i) = set(i) + change(i)
C     Perform test to obtain new pfmopt, for comparison with pfmstr.
      if (pfmopt − pfmstr) 44,44,41
C     To minimize pfmopt, replace the series of number in
      above by "41,41,44".
43    do 45 i = 1,m
      base(i) = set(i)
45    unit(i) = unit (i)/2.
      go to 24
C     The above program for n = up to 512. For larger n,
      change the dimension
C     statement and reverse more memory space in microprocessor.
```

I claim:

1. A method for self-optimizing, in real time, a machine relative to a specific performance characteristic in response to variations on a prescribed number m of variables comprising:

selecting a statistical design which prescribes the number n of tests and the exact design matrix in which the test level of each of the m variables is specified for all the n tests;

according to the design matrix simultaneously sensing and adjusting to their respectively specified test levels all said m variables at a specific time instant;

recording and storing the value of the specific performance characteristic in response to all said m variables at their respective test levels for this specific time instant;

sequentially and repeatedly sensing and adjusting the conditions of all said m variables according to the design matrix at n-1 substantially consecutive time instants within minutes subsequent to said specific time instant;

sequentially and repeatedly recording and storing the n-1 values of the specific performance characteristic in response to all said m variables at their respective levels for the n-1 subsequent, consecutive time instants;

analyzing the n sets of recorded values and combinations of levels of said variables to determine the functional relationship between said variables and said specific performance characteristic;

from the functional relationship determining the singular combination of the conditions of said m variables that gives optimum value for the specific performance characteristic for the particular time instants and condition, environment, and service requirements of the machine; and setting the conditions or levels of said m variables at their respective, thus-determined conditions.

2. A method as in claim 1 wherein said statistical design is an orthogonal design so that the effect of each of said m variables can be determined independently of the presence, and without being affected by the simultaneous variation and testing, of the other m-1 variables.

3. A method as in claim 2 wherein m is at least 7 and said design matrix is a factorial design matrix.

4. A method as in claim 2 wherein m is at least 31 and said design matrix is a fractionally replicated, factorial design matrix.

5. A method as in claim 1 wherein said statistical design is a symmetrical design so that each condition or level of every variable is tested exactly the same number of times in the n tests.

6. A method as in claim 5 wherein m is at least 250, and said statistical design is a sequential screening design.

7. A method as in claim 1 wherein said selecting, sensing and adjusting, recording and storing, sequential and repeated sensing and adjusting and recording and storing, analyzing, determining, and setting steps are done under the control of a microprocessor having calculating speeds better than several nonoseconds.

8. A machine for self-optimizing, in real time, a specific performance characteristic in response to variations on a prescribed number m of variables comprising:

means for selecting a statistical design which prescribes the number n of tests and the exact design matrix in which the test level of each of the m variables is specified for all the n tests;

means for simultaneously sensing and adjusting to their respectively prespecified test levels all said m variables according to the design matrix at a specific time instant;

means for storing the value of the specific performance characteristic in response to all said m variables at their respective test levels for this specific time instant;

means for sequentially and repeatedly adjusting the conditions of all said m variables according to the design matrix at $n-1$ substantially consecutive time instants within minutes subsequent to said specific time instant and also storing the $n-1$ values of the specific performance characteristic in response to all said m variables at their respective levels;

means for analyzing the n sets of stored values and combinations of levels of said variables to determine the functional relationship between said variables and said specific performance characteristic;

means for determining from the functional relationship the singular combination of conditions of said m variables that gives optimum value for the specific performance characteristic; and means for setting the conditions or levels of said m variables at their respective, thus-determined conditions.

9. A machine as in claim 8 wherein said analyzing means includes means for computing the partial derivatives of the specific performance characteristic relative to every variable so as to determine the path of steepest ascent; and including means for performing a series of additional optimizing tests by varying said variables along the determined path of steepest ascent.

10. A machine as in claim 9 wherein said computing means is a programmed microprocessor having calculating speeds better than several nanoseconds.

11. A machine as in claim 8 including means for periodically checking at pre-specified time intervals the constancy of the functional relationship; and means for adjusting said variables to the new unique combination when said function relationship significantly changes with time.

12. A machine as in claim 8 including means for reducing the ranges of the test levels for said m variables and means for repeating prescribed steps of the optimizing procedure.

13. A machine as in claim 8 which is in the form of an industrial processing equipment, and wherein said specific performance characteristic is the product cost, and said variables include at least several of those selected from the group consisting of: type and amount of raw materials, chemical elemental concentrations at designated locations, processing temperature, applied pressures, and processing times.

14. A machine as in claim 8 which is in the form of a car; and wherein said specific performance characteristic is fuel economy, and said variables include at least several of those selected from the group consisting of: car design and style, engine speed, temperature, or settings, type and amount of fuel and oil, air-fuel ratio, pressures in combustion chambers, fuel ignition conditions, loading on car, exhaust design, age and condition of car, wind type direction, and velocity, rain or snow presence, driver habit and condition, road age, slope and condition, and traffic type and density.

15. A machine as in claim 8 which is in the form of combination drug dispenser for a sick patient and embodying a programmed, nanosecond microprocessor, and wherein said variables are m drug components while said performance characteristic is a prescribed medical effect and wherein said setting means comprises means for dispensing said m drug components in optimum combination of dosages or levels.

16. The machine as in claim 8 wherein said consecutive time instants are no later than said specific time instant by several seconds.

17. The machine as in claim 8 in the form of an integrated and self-contained, industrial processing equipment and wherein said specific performance characteristic to be dynamically self-optimized is the unit processing cost and said m variables are processing variables.

18. The machine as in claim 8 in the form of a transportation vehicle and wherein said specific performance characteristic relates to a cost factor in the operation of the vehicle and said m variables include those selected from the group consisting of vehicle, weather, road, and vehicle loading, operator, and operating conditions.

19. The machine as in claim 8 in the form of a drug-dispensing machine self-optimized to dispense the optimum combination of drugs into a sick patient and wherein said specific performance characteristic is the medical condition of the patient including the function of a vital organ of the patient and said m variables are a multitude of chemicals or drugs to be administered to the patient.

20. The machine as in claim 19 wherein the drugs in optimum combinations are administered to the patient in a substantially continuous manner.

21. The machine as in claim 8 in the form of a mineral drilling machine and wherein said performance characteristic is a unit cost of drilling and said m variables include drilling, personal, and environmental variables.

22. The machine as in claim 15 having a total volume of less than 0.1 cubic meter.

23. The machine as in claim 8 wherein said analyzing means is sufficiently light, small, and power-thrifty to be installed on the machine, and yet has sufficiently large memory and also fast calculating speeds to handle billions of calculating steps for the required, real time optimization.

24. The method as in claim 1 including periodically reevaluating said performance characteristic at time instants within minutes subsequent to said n successive time instants to collect additional data on said m variables and performance characteristic; redetermining the new, real-time functional relationships and optimum combinations; and substantially instantly resetting said m variables at the new optimum combinations thereby dynamically maintaining the system optimized at all subsequent time instants.

25. The method as in claim 1 wherein said functional relationship is a linear functional relationship.

26. The method as in claim 1 wherein said functional relationship is a non-linear functional relationship.

27. The method as in claim 1 wherein n is a minor fraction of m.

28. The method as in claim 1 wherein m exceeds 1,000.

* * * * *